United States Patent
Abdo et al.

(10) Patent No.: US 6,732,196 B2
(45) Date of Patent: May 4, 2004

(54) ALLOWING SLOTS BELONGING TO A SECOND SLOT CATEGORY TO RECEIVE I/O ACCESS REQUESTS BELONGING TO A FIRST AND A SECOND ACCESS REQUEST CATEGORIES IN A ROUND ROBIN FASHION

(75) Inventors: Abdo Esmail Abdo, Rochester, MN (US); Troy David Armstrong, Rochester, MN (US); Michael S. Faunce, Rochester, MN (US); Kurt Walter Pinnow, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 10/083,005

(22) Filed: Feb. 26, 2002

(65) Prior Publication Data

US 2003/0163609 A1 Aug. 28, 2003

(51) Int. Cl.[7] .............................. G06F 13/14
(52) U.S. Cl. .................. 710/6; 710/5; 710/40; 710/45
(58) Field of Search .................. 710/5, 6, 39, 40, 710/45, 74, 117, 124; 370/395.21, 395.4, 395.41, 395.42, 458, 330, 459, 461; 711/111, 112, 114, 158

(56) References Cited

U.S. PATENT DOCUMENTS

| | | | | |
|---|---|---|---|---|
| 4,969,120 A | * | 11/1990 | Azevedo et al. | 710/117 |
| 5,535,212 A | * | 7/1996 | Koopman et al. | 370/455 |
| 6,496,899 B1 | * | 12/2002 | DeMoney | 711/112 |
| 6,504,820 B1 | * | 1/2003 | Oliva | 370/232 |
| 6,567,396 B1 | * | 5/2003 | Pohjanvouri et al. | 370/349 |
| 6,580,719 B1 | * | 6/2003 | Soboleva et al. | 370/412 |
| 6,603,747 B2 | * | 8/2003 | Asai | 370/322 |
| 2002/0052909 A1 | * | 5/2002 | Seeds | 709/104 |
| 2002/0126692 A1 | * | 9/2002 | Haartsen | 370/450 |

* cited by examiner

*Primary Examiner*—Ilwoo Park
(74) *Attorney, Agent, or Firm*—Bracewell & Patterson, LLP

(57) ABSTRACT

A method for dispatching input/output access requests to a direct access storage device (DASD) is disclosed. Each of a group of I/O access requests to DASD is assigned into one of at least two I/O access request categories, namely, high priority I/O access requests and low priority I/O access requests. Each of a group of I/O slots within DASD is assigned into one of at least two I/O slot categories, namely, high priority I/O slots and low priority I/O slots. An I/O access request from a first one of the two I/O access request categories is sent to any one of the I/O slots. An I/O access request from a second one of the two I/O access request categories is sent to only a slot belonging to a subset of the two I/O slot categories.

12 Claims, 3 Drawing Sheets

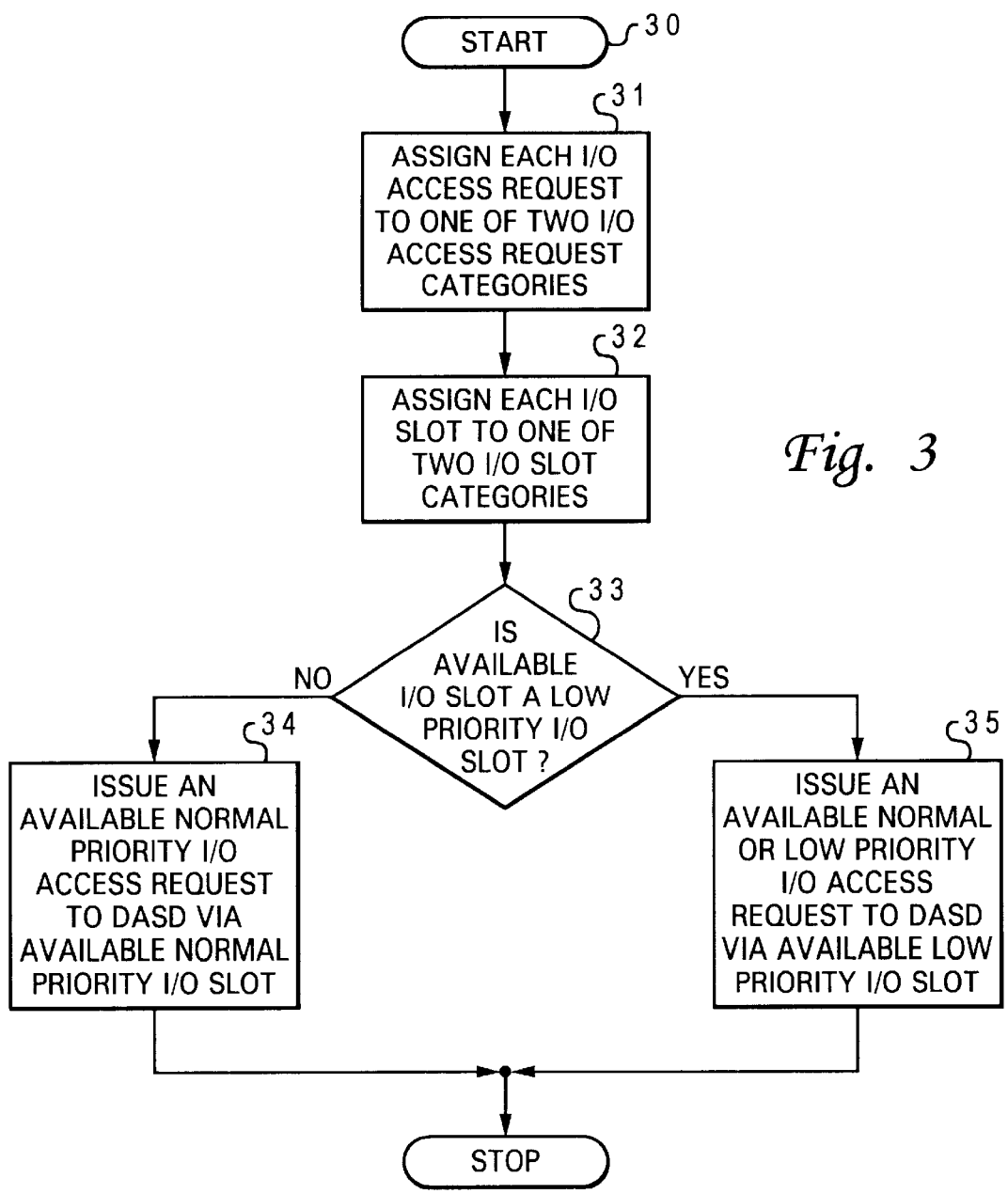

ALLOWING SLOTS BELONGING TO A SECOND SLOT CATEGORY TO RECEIVE I/O ACCESS REQUESTS BELONGING TO A FIRST AND A SECOND ACCESS REQUEST CATEGORIES IN A ROUND ROBIN FASHION

BACKGROUND OF THE INVENTION

1. Technical Field

The present invention relates to direct access storage devices in general, and in particular to input/output operations for direct access storage devices. Still more particularly, the present invention relates to a method for dispatching access requests to a direct access storage device.

2. Description of the Related Art

Within a computer system, a relatively large direct access storage device (DASD) is frequently accessed by various software tasks that are dispatched by application software or operation system. Thus, the speed at which data can be transferred to and/or from the DASD plays a significant role in the overall performance of the computer system.

A software application typically needs to access DASD for reading data from and/or writing data to DASD. During the operation of DASD, sometimes the operating system would want to collect various statistical information from DASD. Quite often the software application and the operating system (collectively referred to as "requesters") attempt to access DASD at the same time. As such, many computer systems employ scheduling algorithms to arbitrate concurrent DASD access requests that are sent by more than requester. Although some access requests can be considered as low priority access requests, DASD is still required to service those kind of access requests. Thus, in many instances, it is very difficult for a scheduling algorithm to adequately balance the competing interests between the performance of the software application executing on the computer system and the required housekeeping tasks maintained by the operating system. Whenever the above-mentioned two competing interests are not optimally balanced, the performance of the overall computer system suffers. Consequently, it would be desirable to provide an improved method for dispatching input/output access requests to DASD.

SUMMARY OF THE INVENTION

In accordance with a preferred embodiment of the present invention, each of a group of I/O access requests to DASD is assigned into one of at least two I/O access request categories, namely, high priority I/O access requests and low priority I/O access requests. Similarly, each of a group of I/O slots within DASD is assigned into one of at least two I/O slot categories, namely, high priority I/O slots and low priority I/O slots. An I/O access request from a first one of the two I/O access request categories can be sent to any one of the I/O slots. An I/O access request from a second one of the two I/O access request categories can be sent to only a slot belonging to a subset of the two I/O slot categories.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 3 is a high-level logic flow diagram of a method for dispatching access requests to the direct access storage device from FIG. 1, in accordance with a preferred embodiment of the present invention; and FIG. 4 is a dispatching example of access requests to the direct access storage device from FIG. 1, in accordance with a preferred embodiment of the present invention.

DETAILED DESCRIPTION OF A PREFERRED EMBODIMENT

The present invention may be implemented in a variety of data processing systems having a direct access storage device (DASD). The data processing system may be, for example, a personal computer, a midrange computer or a mainframe computer. In addition, the data processing system may be a stand-alone system or part of a network such as a local-area network (LAN) or a wide-area network (WAN). For the purpose of illustration, a preferred embodiment of the present invention, as described below, is implemented on a midrange computer, such as the AS/400™ series manufactured by International Business Machines Corporation of Armonk, N.Y.

Figure 1:
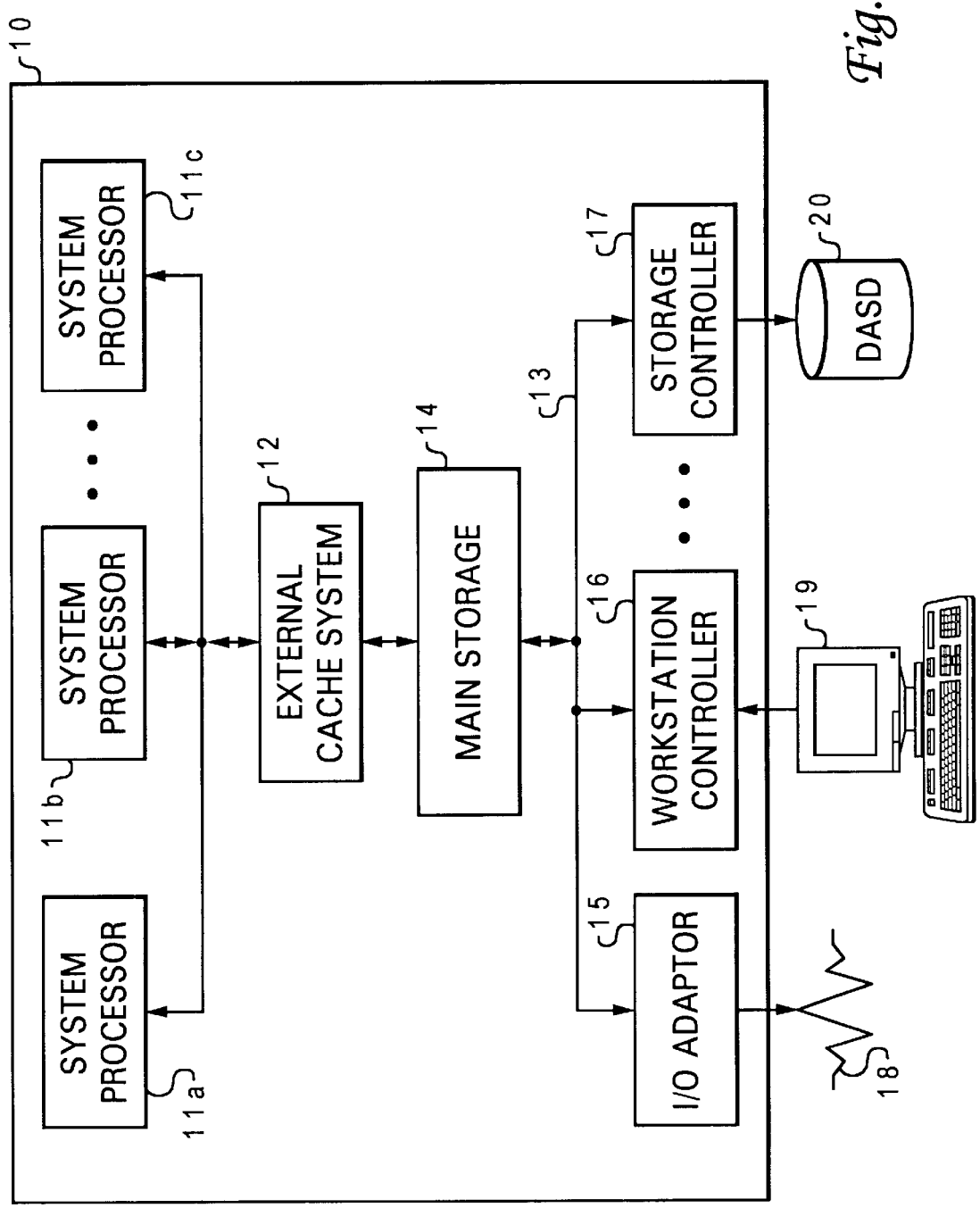
FIG. 1 is a block diagram of a computer system having a direct access storage device, in which a preferred embodiment of the present invention is implemented.

Referring now to the drawings and in particular to FIG. 1, there is depicted a block diagram of a computer system in which a preferred embodiment of the present invention is implemented. As shown, a computer system 10 includes processors 11a–11c coupled to a memory subsystem having a main storage 14 and an external cache system 12. Main storage 14 is coupled to various types of peripheral devices via a respective controller connected to a system input/output (I/O) bus 13. For example, main storage 14 is coupled to a computer network 18, a workstation 19, and a DASD 20 via an I/O adapter 15, a workstation controller 16, and a storage controller 17, respectively, which are connected to system I/O bus 13.

Various software applications, components, objects, modules, data structures, etc., can be executed within computer system 10 under the control of an operating system. Furthermore, various software applications, components, objects, modules, data structures, etc., can also be executed in another computer system that is coupled to computer system 10 via a computer network such as computer network 18. For example, in a distributed or client-server computing environment, the data processing required to implement the functions of a computer program may be allocated to multiple computers distributed over a computer network. In general, the routines executed to implement the preferred embodiment of the present invention, whether implemented as part of an operating system or a specific software application, component, object, module or sequence of instructions will be referred to herein as "computer programs," or simply "programs."

DASD 20 may be any form of direct accessible storage device that is capable of being accessed by multiple sources. DASD 20 may include an array of physical devices controlled by a central controller (not shown). It will be appreciated that a physical position within DASD 20 may be referred to by using a logical block address (LBA), an addressable cell, a track number, a head number, a cylinder number, a platter number, and/or a record number. As far as identifying a task with which an input/output access request is associated, a task identification may be based upon a specific task identifier, a processor identifier, a process identifier, a job identifier, a thread identifier, etc.

Figure 2:
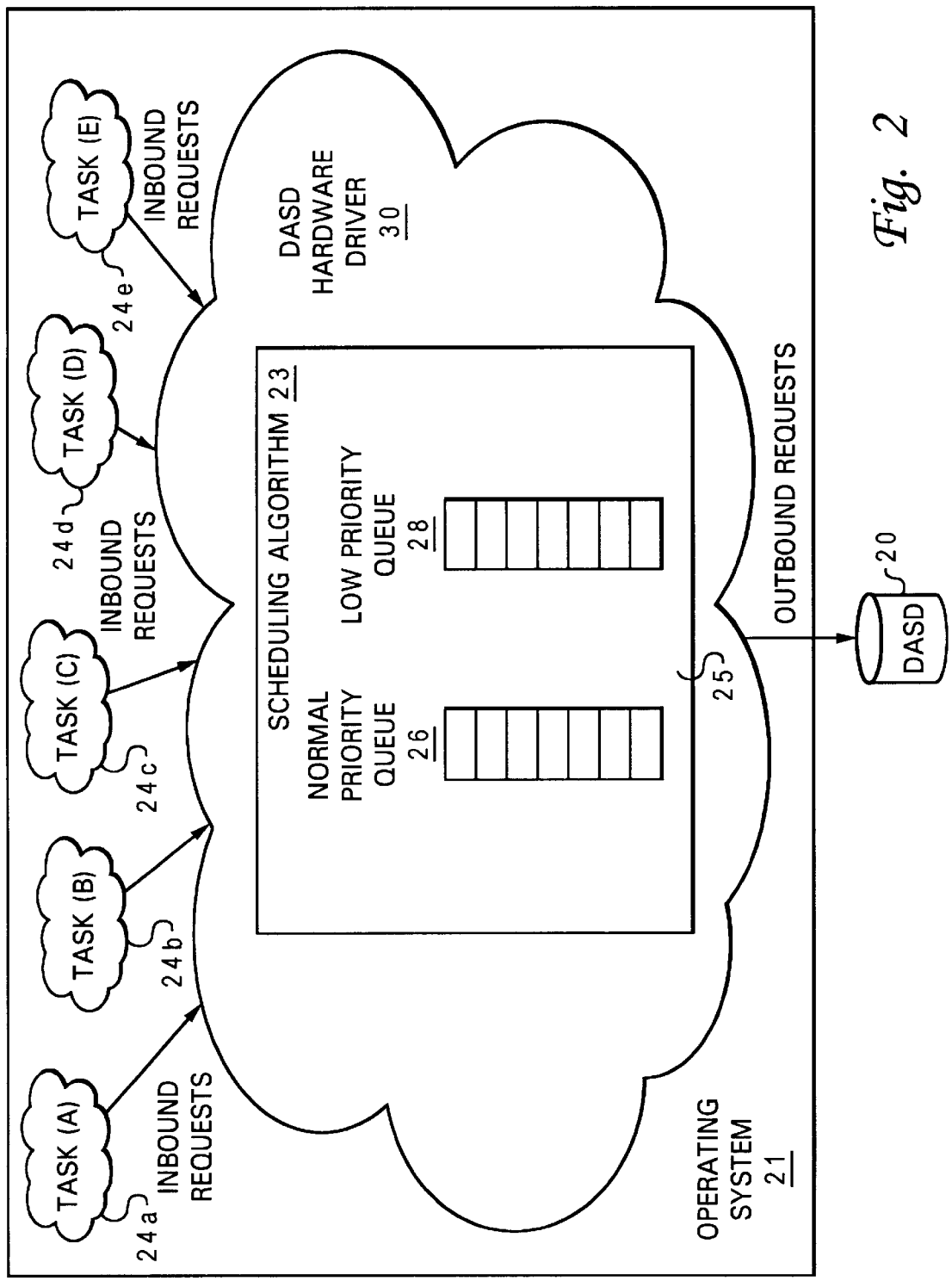
FIG. 2 graphically illustrates various software components within the computer system of FIG. 1, in accordance with a preferred embodiment of the present invention.

With reference now to FIG. 2, there is graphically illustrated various software components within computer system 10 from FIG. 1, in accordance with a preferred embodiment of the present invention. As shown, an operating system 21 includes DASD hardware driver 30 having a scheduling algorithm 23. All access requests to DASD 20 are sent to DASD hardware driver 30, and the access requests are then issued to DASD 20 in a predetermined sequence by scheduling algorithm 23 within DASD hardware driver 30 for providing a read and/or write operation to DASD 20, accordingly. In this example, DASD 20 is accessed by tasks 24a–24e via DASD hardware driver 30.

Scheduling algorithm 23 includes two queues, namely, a normal priority queue 26 and a low priority queue 28, for processing access requests from tasks 24a–24e to DASD 20.

Storage controller 17 (from FIG. 1) includes a set of I/O slots for handling I/O access requests that are intended for DASD 20. In accordance with a preferred embodiment of the present invention, I/O slots within storage controller 17 are designated as one of two categories, namely, normal priority I/O slots and low priority I/O slots. For example, if storage controller 17 has six I/O slots for handling I/O access requests intended for DASD 20, then four I/O slots can be designated as normal priority I/O slots and two I/O slots can be designated as low priority I/O slots. Each access request arriving at DASD hardware driver 30 has already been predetermined by its respective requester (such as any one of tasks 24a–24e) to be either a low priority I/O access request or a normal priority I/O access request. If an access request is a normal priority I/O access request, then the I/O access request is allowed to be dispatched using any of the six I/O slots (i.e., both normal priority I/O slots and low priority I/O slots). If an access request is a low priority I/O access request, then the I/O access request is only allowed to be dispatched using any one of the two low priority I/O slots.

The I/O slots are associated with normal priority queue 26 and low priority queue 28. When all I/O slots are occupied at the time of dispatching an access request, the access request is sent to either normal priority queue 26 or low priority queue 28, depending on the nature of the access request. When an appropriate one of the previously occupied I/O slots becomes available, the access request is removed from one of normal priority queue 26 or low priority queue 28, and is then sent to the corresponding I/O slot. Following the above-mentioned rule, if a normal priority I/O slot is available, only normal priority queue 26 is allowed to send an access request to the normal priority I/O slot. If a low priority I/O slot is available, then both normal priority queue 26 and low priority queue 28 are allowed to send an access request to the low priority I/O slot. Preferably, a round robin algorithm can be used by the low priority slot to select an access request from either normal priority queue 26 or low priority queue 28.

Referring now to FIG. 3, there is illustrated a high-level logic flow diagram of a method for dispatching access requests to DASD 20 (from FIG. 1), in accordance with a preferred embodiment of the present invention. Starting at block 30, each of a group of I/O access requests to DASD is assigned to one of at least two I/O access request categories, as shown in block 31. The two I/O access request categories are preferably normal priority I/O access requests and low priority I/O access requests. Then, each of a group of I/O slots within DASD is assigned to one of at least two I/O slot categories, as depicted in block 32. The two I/O slot categories are preferably normal priority I/O slots and low priority I/O slots. When an I/O slot becomes available, a determination is made as to whether the available I/O slot is a low priority I/O slot, as shown in block 33. If the available I/O slot is not a low priority I/O slot (which means the available I/O slot is a normal priority I/O slot), then an available normal priority I/O access request is issued to DASD via the available normal priority I/O slot, as depicted in block 34. The available normal priority I/O access request may be issued from a normal priority queue. Otherwise, if the available I/O slot is a low priority I/O slot, then either an available normal priority I/O access request or an available low priority I/O access request can be issued to DASD via the available low priority I/O slot, as shown in block 35. The available normal priority I/O access request may be issued from a normal priority queue, and the available low priority I/O access request may be issued from a low priority queue. A round robin algorithm can be used to select between normal priority I/O access requests and low priority I/O access requests.

As an example, assume that there is an infinite supply of normal priority I/O access requests from five different tasks, namely, task A, task B, task C, task D and task E. Also assume that there are three different low priority I/O tasks, namely, task X, task Y and task Z for supplying low priority I/O access requests. If all access requests can be dispatched and completed at the same time, the order that I/O access requests can be dispatched is shown in FIG. 4. Suppose I/O slots 1–4 are normal priority I/O slots that only normal priority I/O access requests are allowed to dispatch, while I/O slots 5–6 are low priority I/O slots that both normal and low priority I/O access requests are allowed to dispatch. Normal and low priority I/O access requests can be interleavely dispatched to low priority I/O slots 5–6 under a round robin scheme.

After six dispatching cycles, according to FIG. 4, a total of 36 access requests are dispatched to DASD 20, with 30 being normal priority I/O access requests and 6 being low priority I/O access requests. The allocation scheme of the present invention provides the normal priority I/O access requests with a 83% (i.e., 30/36) of the total bandwidth and the low priority I/O access requests with a 17% (i.e., 6/36) of the total bandwidth. In contrast, under the prior art allocation scheme, a DASD hardware driver would have done a simple round robin algorithm between all eight tasks without reference to the priority, so the normal priority I/O access requests would have received 63% (i.e., 5 tasks/8 tasks) of the total bandwidth, and the low priority I/O access requests would have received 37% (i.e., 3 tasks/8 tasks) of the total bandwidth. Hence, with the present invention, the normal I/O access requests are able to receive a larger percentage of the I/O bandwidth, thereby improving the performance of the normal priority tasks.

In the above-mentioned example, normal priority I/O access requests are allowed to consume all available I/O bandwidth (i.e., all six I/O slots), and low priority I/O access requests are only allowed to consume 33% of the available I/O bandwidth (i.e., two out of six I/O slots). Hence, even when the I/O slots are flooded with low priority I/O access requests and all the normal priority I/O slots are fully occupied at the time, there will be slots reserved for the immediate issuance of a newly arriving normal priority access request. In addition, once a flood of normal priority I/O access requests arrived, they are allowed to share the bandwidth with the low priority I/O slots, thus reducing the bandwidth of the low priority I/O slots even further. In addition, the round robin selection algorithm can prevent any starvation of low priority I/O slots from occurring.

The present invention can be modified by varying the total number of available I/O slots, by varying the proportion between the number of normal priority I/O slots and the number of low priority I/O slots, and by including more than two types of access requests. Also, there are choices that can be made with respect to how the decision is made between labeling an operation as either normal or low priority (e.g., task priority, size of operation, type of operation).

As has been described, the present invention provides a method for dispatching I/O access requests to DASD. In summary, the important rules of the present invention are:

(1) Normal priority I/O access requests can use all available I/O slots;

(2) Low priority I/O access requests can only use low priority I/O slots (i.e., a subset of the available I/O slots);

(3) When a normal priority I/O slot becomes available, only a normal priority I/O access request can be dispatched from a normal priority queue; and (4) When a low priority I/O slot becomes available, then either a low or normal priority I/O access request is allowed to be dispatched, preferably, in a round robin fashion based on the sorted priority and issuing task ID fields.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for dispatching input/output (I/O) access requests to an I/O device, said method comprising:

assigning each of a plurality of I/O access requests to an I/O device into one of two I/O access request categories;

assigning each of a plurality of I/O slots within said I/O device into one of two I/O slot categories;

allowing slots belonging to a first of said two I/O slot categories to receive I/O access requests belonging only to a first of said two I/O access request categories; and allowing slots belonging to a second of said two I/O slot categories to receive I/O access requests belonging to said first and a second of said two I/O access request categories, wherein I/O access requests from said first and second of said two I/O access request categories are dispatched to a slot belonging to said second of said two I/O slot categories in a round robin fashion.

2. The method of claim 1, wherein said I/O device is a direct access storage device.

3. The method of claim 1, wherein said first of said two I/O access request categories includes high priority I/O access requests, and said second of said two I/O access request categories includes low priority I/O access requests.

4. The method of claim 3, wherein said first of said two I/O slot categories includes high priority I/O slots, and said second of said two I/O slot categories includes low priority I/O slots.

5. A computer program product residing on a computer usable medium for dispatching input/output (I/O) access requests to an I/O device, said computer program product comprising:

program code means for assigning each of a plurality of I/O access requests to an I/O device into one of two I/O access request categories;

program code means for assigning each of a plurality of I/O slots within said I/O device into one of two I/O slot categories;

program code means for allowing slots belonging to a first of said two I/O slot categories to receive I/O access requests belonging only to a first of said two I/O access request categories; and program code means for allowing slots belonging to a second of said two I/O slot categories to receive I/O access requests belonging to said first and a second of said two I/O access request categories, wherein I/O access requests from said first and second of said two I/O access request categories are dispatched to a slot belonging to said second of said two I/O slot categories in a round robin fashion.

6. The computer program product of claim 5, wherein said I/O device is a direct access storage device.

7. The computer program product of claim 5, wherein said first of said two I/O access request categories includes high priority I/O access requests, and said second of said two I/O access request categories includes low priority I/O access requests.

8. The computer program product of claim 7, wherein said first of said two I/O slot categories includes high priority I/O slots, and said second of said two I/O slot categories includes low priority I/O slots.

9. A computer system capable of dispatching input/output (I/O) access requests to an I/O device, said computer system comprising:

means for assigning each of a plurality of I/O access requests to an I/O device into one of two I/O access request categories;

means for assigning each of a plurality of I/O slots within said I/O device into one of two I/O slot categories;

means for allowing slots belonging to a first of said two I/O slot categories to receive I/O access requests belonging only to a first of said two I/O access request categories; and means for allowing slots belonging to a second of said two I/O slot categories to receive I/O access requests belonging to said first and a second of said two I/O access request categories, wherein I/O access requests from said first and second of said two I/O access request categories are dispatched to a slot belonging to said second of said two I/O slot categories in a round robin fashion.

10. The computer system of claim 9, wherein said I/O device is a direct access storage device.

11. The computer system of claim 9, wherein said first of said two I/O access request categories includes high priority I/O access requests, and said second of said two I/O access request categories includes low priority I/O access requests.

12. The computer system of claim 11, wherein said first of said two I/O slot categories includes high priority I/O slots, and said second of said two I/O slot categories includes low priority I/O slots.

* * * * *